US006986871B2

United States Patent
Strömer et al.

(10) Patent No.: US 6,986,871 B2
(45) Date of Patent: Jan. 17, 2006

(54) DEVICE FOR CATALYTIC TREATMENT OF FLUIDS

(75) Inventors: Fredrik Strömer, Lund (SE); Lars Fogelberg, Helsingborg (SE); Sven Andersson, Hassleholm (SE); Tomas Dahlberg, Helsingborg (SE); Åke Narfgren, Grevie (SE)

(73) Assignee: SWEP International AB, Landskrona (SE)

( * ) Notice: Subject to any disclaimer, the term of this patent is extended or adjusted under 35 U.S.C. 154(b) by 649 days.

(21) Appl. No.: 10/204,478

(22) PCT Filed: Feb. 8, 2001

(86) PCT No.: PCT/SE01/00236

§ 371 (c)(1),
(2), (4) Date: Sep. 12, 2002

(87) PCT Pub. No.: WO01/63174

PCT Pub. Date: Aug. 30, 2001

(65) Prior Publication Data

US 2003/0051865 A1    Mar. 20, 2003

(30) Foreign Application Priority Data

Feb. 24, 2000  (SE) .................................... 0000591

(51) Int. Cl.
*B01J 8/00*    (2006.01)
*F28F 3/12*    (2006.01)

(52) U.S. Cl. .................. 422/198; 422/222; 422/211; 165/7; 165/10; 165/133; 165/166

(58) Field of Classification Search ............... 422/198, 422/211, 22; 165/7, 10, 133, 166
See application file for complete search history.

(56) References Cited

U.S. PATENT DOCUMENTS

| | | | | |
|---|---|---|---|---|
| 3,709,473 A | * | 1/1973 | Ito et al. ..................... | 122/18.3 |
| 4,903,755 A | * | 2/1990 | Michelfelder et al. ......... | 165/7 |
| 5,324,452 A | * | 6/1994 | Allam et al. ................. | 252/373 |
| 5,931,219 A | * | 8/1999 | Kull et al. ..................... | 165/51 |
| 6,180,846 B1 | * | 1/2001 | Dandekar et al. ........... | 585/443 |
| 2003/0021739 A1 | * | 1/2003 | Boneberg et al. ........... | 422/173 |
| 2004/0141893 A1 | * | 7/2004 | Martin ....................... | 422/198 |
| 2004/0241060 A1 | * | 12/2004 | Silversand ................... | 422/198 |
| 2005/0089731 A1 | * | 4/2005 | Ogiwara et al. .............. | 429/19 |

\* cited by examiner

*Primary Examiner*—N. Bhat
(74) *Attorney, Agent, or Firm*—Breiner & Breiner, L.L.C.

(57) ABSTRACT

A device for catalytic treatment of a first fluid medium and for changing heat between the first fluid medium and a second fluid prior to or after the catalytic treatment comprises a plate heat exchanger (1) of the type in which the plates (2) are rigidly interconnected by welding or soldering. A catalyst carrier (21) has been detachably fastened to the plate heat exchanger (1) and protrudes into one of the ports (7) of the exchanger (1).

7 Claims, 3 Drawing Sheets

DEVICE FOR CATALYTIC TREATMENT OF FLUIDS

The present invention relates to a device for performing catalytic treatment of fluids and heat exchange between said fluids and a separate fluid medium prior to or after the catalytic treatment, said device comprising a plate heat exchanger having at least two separate circuits for exchanging heat between fluid media, said circuits being defined by a plurality of interconnected, stacked plates, the plate heat exchanger having an inlet and an outlet opening for each circuit, each inlet and outlet opening communicating with a generally cylindrical port extending into the heat exchanger mainly perpendicular to the general direction of the heat exchanger plates, said port communicating with one of the circuits E.g. for providing sanitary hot water and water for domestic heating it is known to use boilers having burners for catalytic combustion of a gaseous fuel with air or an atomized liquid fuel with air The exhaust gases are passed through a heat exchanger after having left the combustion chamber of the boiler. The catalytic combustion may provide an effective combustion causing very clean exhaust gases. In particular the contents of $NO_x$ may be extremely low It is also known that a heat exchange between exhaust gases and water to be heated may be performed most efficiently in a plate heat exchanger. A combination of a catalytic burner and a plate heat exchanger would certainly result in a device combining the advantages of clean burning and a compact, low weight design For high temperature use a plate heat exchanger may be manufactured most efficiently by brazing or welding the plates of the exchanger together. However, the catalysts generally used for performing catalytic combustion contain noble metals or metal oxides which may be detrimentally effected by vaporized materials present during a high temperature welding or brazing process Thus it is not advisable to include catalyst material in the process of manufacturing plate heat exchangers According to the present invention at least one of the ports of the heat exchanger contains a wire mesh catalyst element sealed and detachably connected to the opening of the heat exchanger at the actual port so that the fluid passing the port is simultaneously forced through the wire mesh catalyst element.

In case the device is to be used for combustion of e.g. natural gas or atomized liquid fuel with air the said wire mesh catalyst element together with an igniter for combustion of fuel with air is mounted in an inlet port of the plate heat exchanger.

However, the same way of mounting of the catalytic element in a plate heat exchanger may be used in a device for vaporizing e.g. methyl alcohol and subsequently catalytic cracking thereof if the said wire mesh catalyst element is mounted at an outlet port of the heat exchanger for catalytic cracking of a fluid preheated in the plate heat exchanger The catalytic cracking of methyl alcohol will result in the formation of hydrogen gas which may be used in a following fuel cell for providing electricity A more detailed explanation of the present invention and of the advantages obtained thereby will be evident from the following description of a preferred embodiment, reference being made to the accompanying drawings in which:

Figure 1:
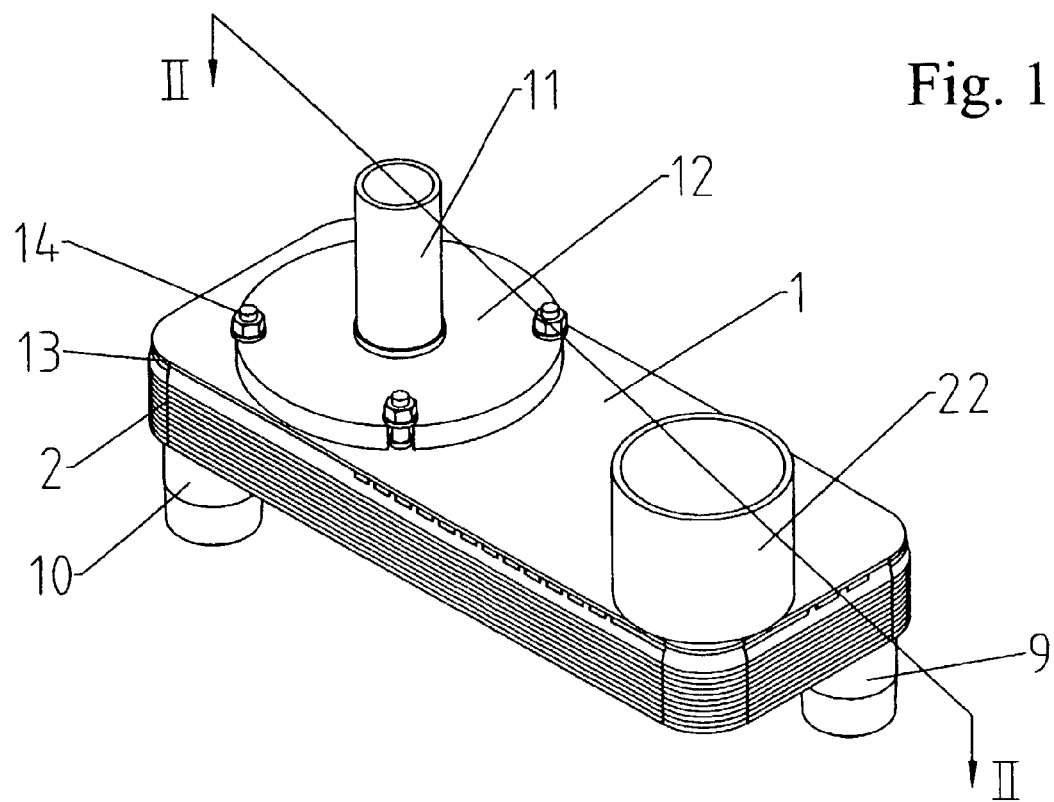
FIG. 1 is a perspective view of a device according to the invention for the combustion of a fuel with air and for heating water for domestic use
Figure 2:
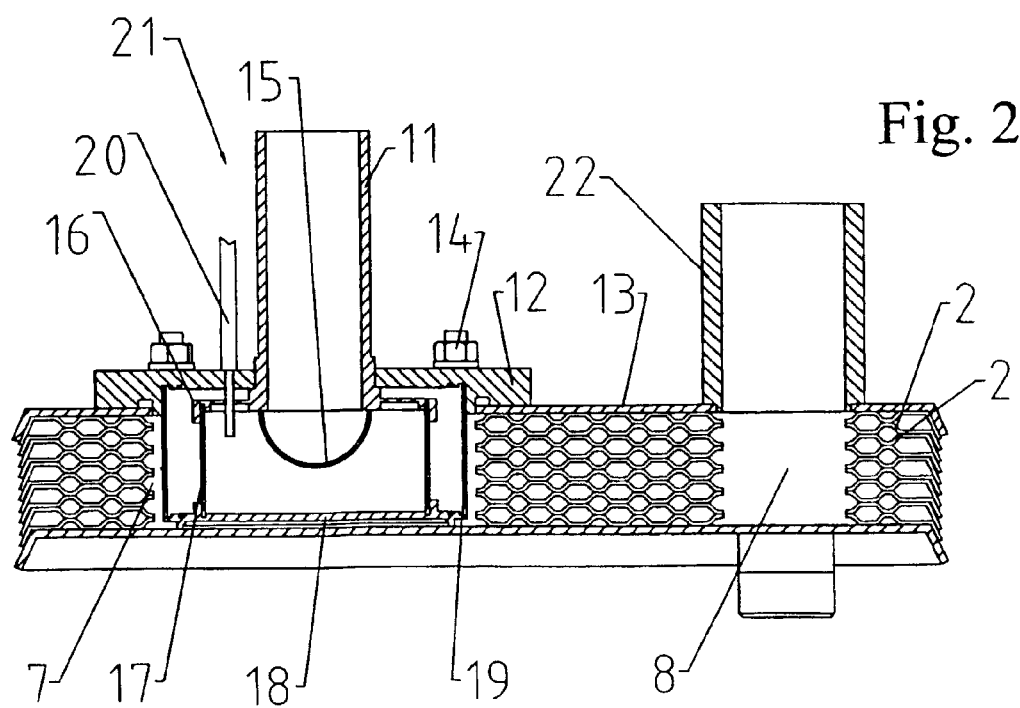
FIG. 2 is a section along the line II—II of FIG. 1
Figure 3:
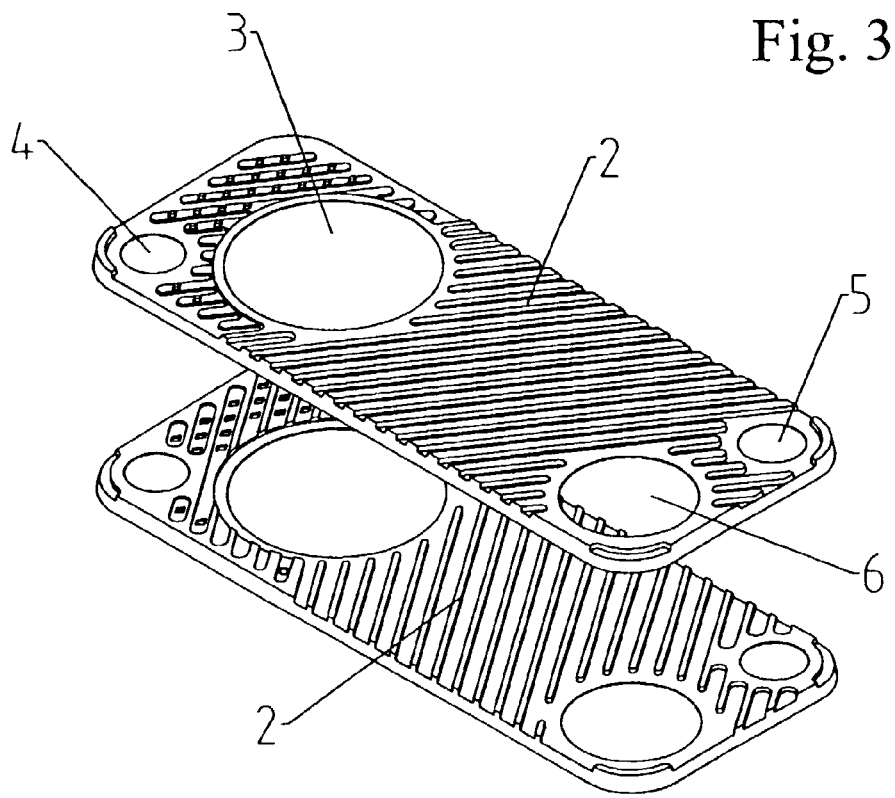
FIG. 3 is a perspective view of two adjacent heat exchanger plates in the device shown in FIGS. 1 and 2, the plates being separated.

As shown in FIGS. 1 and 2 a plate heat exchanger 1 is composed of a number of stacked plates 2 defining two separate systems of channels for two different fluid media between them As shown in FIG. 3 each of the plates 2 is provided with four holes 3, 4, 5 and 6 which in the stack of plates will define four ports: an inlet and an outlet port for each of the two media to exchange heat FIG. 2 shows the inlet port 7 for exhaust gases from combustion of a fuel with air and an outlet port 8 for said gases leaving the device at a low temperature The reference numeral 9 in FIG. 1 designates an inlet for water to be heated and an outlet for the heated water has been designated by 10

Figure 4:
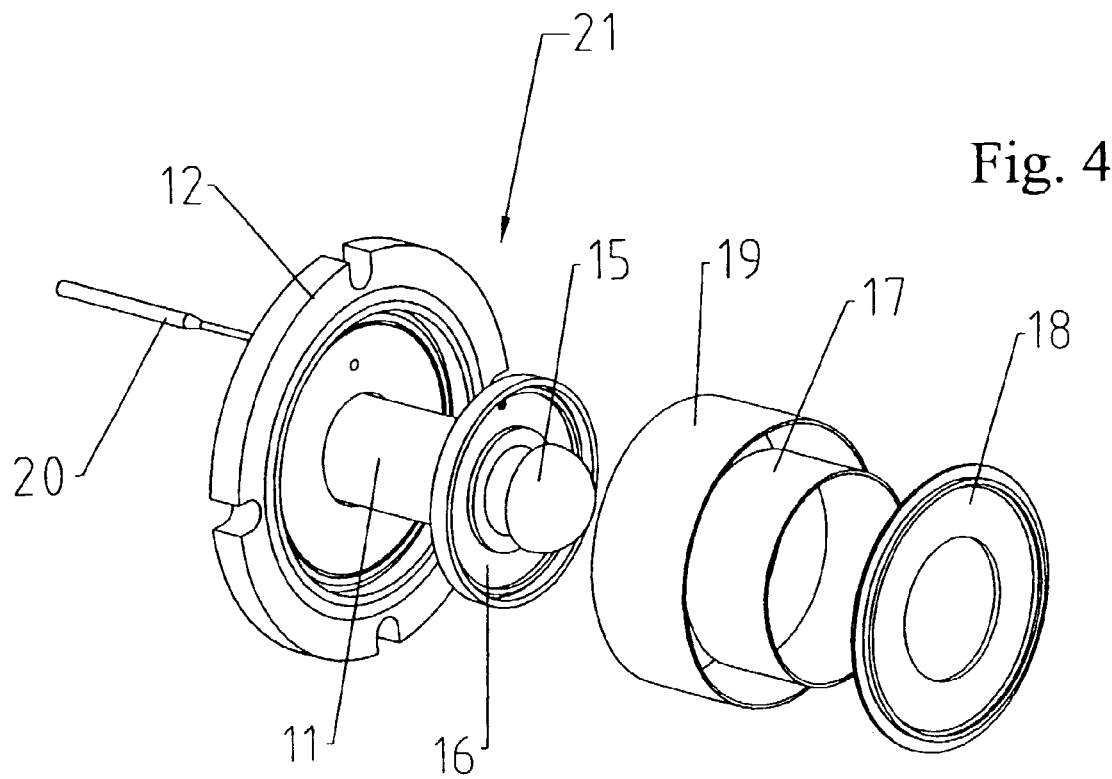
FIG. 4 is a perspective and exploded view of the parts of the burner shown in FIG. 2

As shown more detailed in FIG. 2 a metal tube 11 for introducing fuel and air is secured to a flange 12 which in turn is kept to engage an end plate 13 in the stack of plates 2 by means of bolts 14. A first gas permeable net 15 shaped as part of a sphere is connected to the lower end of the metal tube 11. The lower end of the tube 11 also carries a metal sealing plate 16 extending in a radial plan and carrying a second tubular, gas permeable net 17 Said second tubular net 17 carries a disc shaped metal sealing plate 18 from which a third tubular net 19 having greater diameter than the second net 18 extends upwardly and is rigidly connected to the plate 16 An electric igniter 20 is attached to the flange 12 and serves to start the combustion The components 11, 12 and 15–20 form a burner unit 21 which is removable and easy to replace due to the connection by means of the bolts 14. The unit 21 is separately shown in FIG. 4 in which, however, the components are drawn apart The gas permeable nets 15, 17 and 19 comprise preferably a metal wire mesh based upon an alloy of the type sold under the trade name Kanthal—mainly consisting of iron, chromium and aluminum and widely used for high temperature electric heating coils The wire mesh carries a ceramic coating. e.g. of silica or aluminum oxide, which in turn has been doped with a catalyst material such as a metal of the palladium group or a suitable metal oxide The diameter of the outer net 19 is slightly smaller than that of the inlet port 7 for the combustion gases formed by combustion of the gas-air mixture and defined by the holes 3 in the plates 2 Preferably the holes 3 are of a diameter greater than that of the remaining plate holes 4–6

The inlet port 7 and the outlet port 8 communicate via channels defined by the plates 2 as is conventional in two circuit plate heat exchangers The port 8 communicates with an exhaust gas outlet tube 22. The inlet 9 for water to be heated and the water outlet 10 communicate via channels formed by the plates 2 and located adjacent to the channels guiding the exhaust gases through the plate heat exchanger.

The device shown in FIGS. 1–4 will operate as follows

Figure 5:
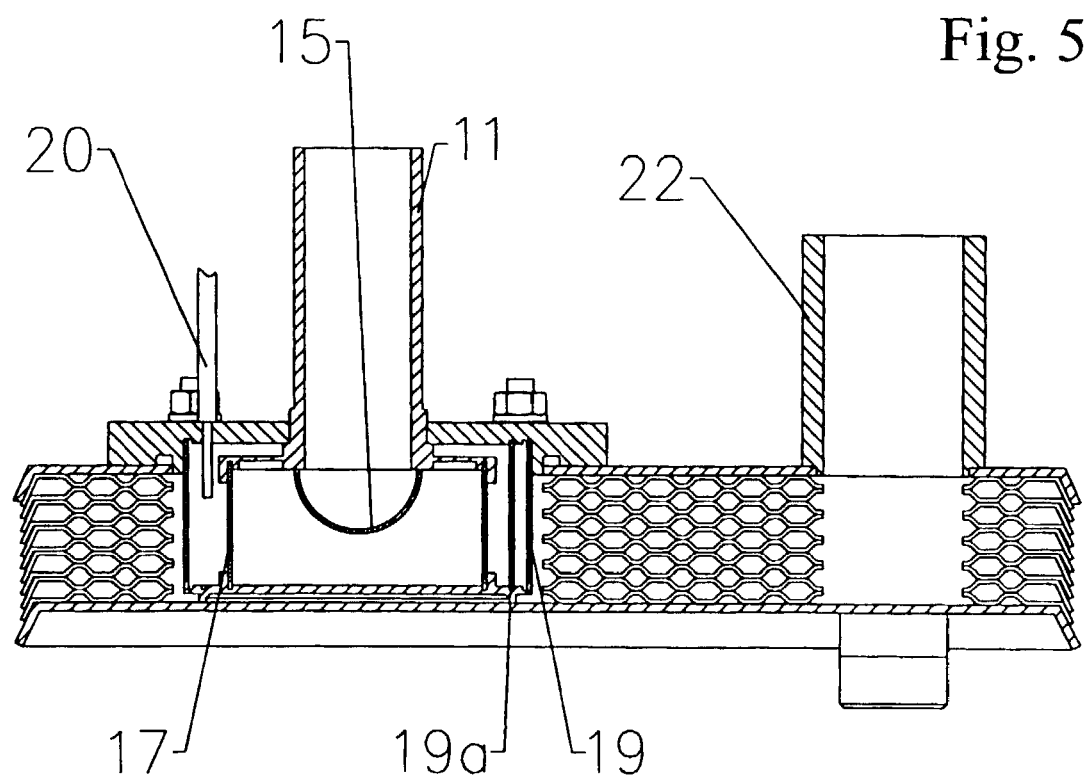
FIG. 5 is a section through a modified embodiment of a catalytic burner to be used in a device of the type shown in FIG. 2

A mixture of fuel (e.g. natural gas or atomized liquid fuel) and air is passed downwardly through the tube 11 and will pass into the space limited by the first and the second catalyst nets 15 and 17. Here, the fuel-air mixture is ignited by the electric igniter 20—a spark plug or an electric heater coil of conventional type The combustion is completed by passing the fuel-air mixture through the three nets 15, 17 and 19 The maximum combustion temperature will be about 800° C. The combustion gases will now immediately pass through the plate heat exchanger via each other of the channels formed therein by the plates 2 The remaining channels are used for flows of water to be heated by the combustion gases As is well known in the art a plate heat exchanger may have a large heat exchange capacity compared to its volume, and the exhaust gases leaving the device via the exhaust gas outlet tube 22 may have a temperature only a few degrees centigrade above the temperature of the heated water As is well known a catalytic combustion may be performed with a minimum of excess of air and provide very clean exhaust gases—even regarding contents of $NO_x$ A high degree of thermal efficiency may be obtained The device described above is of a very compact design due to the location of the burner unit 21 inside the inlet port 7. The way of mounting the unit 21 makes it possible to braze or weld the plates 2 together separate from the catalyst containing nets 15, 17 and 19 The flow of combustion gases from the port 7 to the port 8 will follow a path defined by the flow resistance offered by said path The smallest resistance may be offered by the shortest distance In order to make use of the total heat exchanger volume it may be advantageous to use varying thickness of the third net 19—i.e. the parts of the net 19 located nearest the outlet port 8 could be made of double wire mesh net. This has been shown in FIG. 5 in which the part of the net 19 nearest the outlet port 8 is supplemented by a net part 19a The unit 21 is easy to replace in case of need and the combination of a built-in catalyst burner and a plate heat exchanger is outstanding regarding low weight and volume relative to its heating capacity.

The device shown may be used for catalytic cracking of a fluid needing preheating prior to the catalytic cracking. E.g. methanol may be introduced through the tube 22, preheated by hot water passed through the exchanger from the former outlet 10 to the former inlet 9 The preheated methanol will become cracked when passing the catalyst nets 19, 17 and 15 The flow leaving the device through the tube 11 may later be a source for oxygen and hydrogen to be used in a fuel cell

What is claimed is:

1. A device for catalytic treatment of fluids and heat exchange between said fluids and a separate fluid medium prior to or after catalytic treatment, said device comprising:

a plate heat exchanger having at least two separate circuits for exchanging heat between fluid media, said circuits being defined by a plurality of interconnected stacked plates, said plate heat exchanger having an inlet and an outlet for each of said at least two separate circuits, one inlet and one outlet for one circuit each communicate with a separate substantially cylindrical port extending into the plate heat exchanger essentially perpendicular to the heat exchanger plates, each port communicating with one circuit, wherein at least one port contains a wire mesh catalyst element which is sealed and detachably connected to the heat exchanger at the port for that circuit so that fluid passing through the port is simultaneously forced through the wire mesh catalyst element.

2. A device according to claim 1, further comprising an igniter for combustion of fuel with air, and wherein said wire mesh catalyst element together with the igniter is mounted in the port in communication with an inlet of the plate heat exchanger.

3. A device according to claim 1, wherein said wire mesh catalyst element is mounted at the port of the heat exchanger which is an outlet to provide catalytic cracking of a fluid preheated in the plate heat exchanger.

4. A device according to claim 2 or 3, wherein said wire mesh catalyst element comprises at least two separate wire mesh catalysts arranged in series in the flow path.

5. A device according to claim 4, wherein at least one of said at least two separate wire mesh catalysts is substantially of cylindrical shape and extends through almost a total length of the port.

6. A device according to claim 4, wherein one of said two wire mesh catalysts is at least in part spherical in shape.

7. A device according to claim 1, wherein said wire mesh catalyst contains a metal of the Pd group of metals or a suitable metal oxide supported on a ceramic which in turn is carried by a net of a heat resistant metal or a heat resistant metal alloy.

* * * * *